H. B. Smith's Gang Plow
No. 119,192. Patented Sep. 19, 1871.
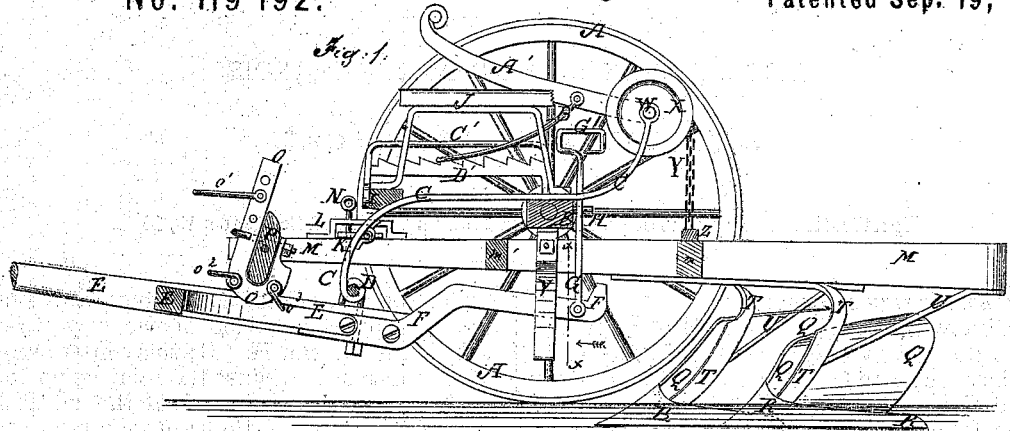
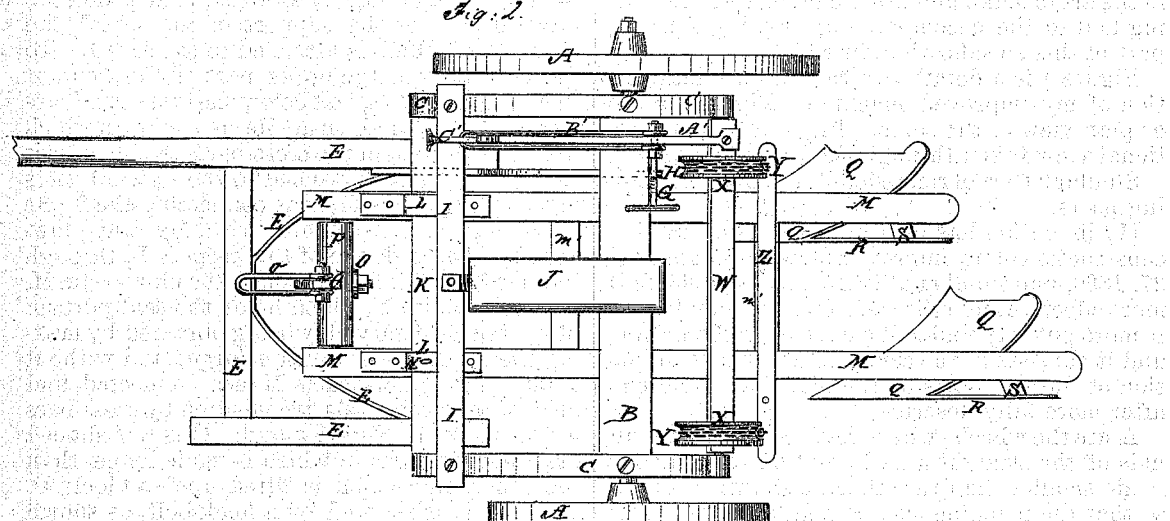
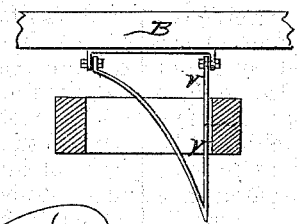
Witnesses:
Chas. Nida
Frank Blockley
Inventor:
H. B. Smith
per Munn & Co
Attorneys.

UNITED STATES PATENT OFFICE.

HOELL B. SMITH, OF TREMONT, ILLINOIS.

IMPROVEMENT IN GANG-PLOWS.

Specification forming part of Letters Patent No. 119,192, dated September 19, 1871.

*To all whom it may concern:*

Be it known that I, HOELL B. SMITH, of Tremont, in the county of Tazewell and State of Illinois, have invented a new and useful Improvement in Gang-Plow; and I do hereby declare that the following is a full, clear, and exact description thereof, which will enable others skilled in the art to make and use the same, reference being had to the accompanying drawing forming part of this specification, in which—

Figure 1 is a detail vertical longitudinal section of my improved machine. Fig. 2 is a top or plan view of the same. Fig. 3 is a detail sectional view taken through the line $x\ x$, Fig. 1.

Similar letters of reference indicate corresponding parts.

My invention has for its object to improve the construction of my improved plow, patented July 27, 1869, and numbered 93,154, so as to make it more effective and reliable in operation and bring it more entirely under the control of the driver; and it consists in the construction and combination of various parts of the machine, as hereinafter more fully described.

A are the wheels, which revolve upon the journals of the straight axle B, and one of which is made smaller than the other, as shown in Fig. 2, so that the machine may be held in a horizontal position when at work, the smaller wheel running upon the unplowed land and the larger one in the furrow. To the axle B, near its ends, are attached the side bars C, the forward ends of which are curved downward and have eyes formed upon or attached to them to receive the ends of the rod D, to which the frame of the tongue E is connected and pivoted by eye or hook-bolts, as shown in Fig. 1. The tongue proper I prefer to place at the side of this frame, as shown in Fig. 2, to adapt the machine to be used with one, two, or three horses, as may be required. To the rear part of the tongue E is attached the forward end of a bar or lever, F, which extends back beneath the axle B, and to the rear end of which is pivoted the lower end of the lever G, which extends up at the rear side of the axle B, and has several holes formed in it to receive a pin, H, attached to the rear side of said axle B. Upon the upper end of the lever G is formed a handle for convenience in operating it. Upon the upper side of the rear end of the bar F is formed an upwardly-projecting shoulder for the lever G to rest against, to prevent it from dropping down out of the way when detached from the pin H. By this construction the driver can readily adjust the relative position of the tongue and frame-work of the machine, as the circumstances of the case may require. To the forward part of the bars C are attached the ends of the cross-bar I, to which is attached the forward foot of the support of the seat J, the rear foot of which is attached to the axle B. To the side bars in the upper part of the bend at their forward ends, and below the cross-bar I, are attached, or upon them are formed, eyes, in which work the journals of the cross-bar K, which passes through keepers L attached to the forward parts of the plow-beams M, thus connecting the frame or carriage of the machine with the said plow-beams. Through one of the keepers L, through the bar K, and into or through the plow-beam M, is passed a pin, N, which holds the said parts in place, the necessary play being obtained by making the other keeper a little larger and without a pin. The plow-beams M are connected and held in the proper relative position by cross-bars $m'$, as shown in Figs. 1 and 2. O is a V-shaped draft-bar, one arm of which is made longer than the other, and which is fitted upon a block, P, to which it is secured by a hook-bolt, as shown in Figs. 1 and 2. To the long arm of the bar O is attached a clevis, $o^1$, for the attachment of a double-tree, which, when three horses are used, should be made long. $o^2$ is a clevis attached to the bar O, at the forward part of the bend of said bar, for the attachment of the whiffletree of the single or middle horse, and which should be enough nearer the draft center than the clevis $o^1$ to give the single horse the necessary advantage of leverage. $o^3$ is a clevis attached to the rear part of the bend of the draft O for the attachment of an ordinary plow when desired. Q is the mold-board of the plow, the forward edge of which forms or serves as a colter. R is the land-side of the plow, the forward end of which is secured to or formed solid upon the lower part of the forward edge of the mold-board Q. The rear parts of the mold-board Q and land-side R are held in their proper relative positions and supported against side pressure by the cross-bar or arm S, the ends of which are attached to or formed solid with the said parts Q R. T are the standards, the lower parts of which are attached to or formed solid upon the inner sides of the mold-boards Q and cross-bars on arms S, a little in the rear of the forward edges of the said mold-boards, as shown in Fig. 1. The upper part of the standards T extends forward along the under side of the beams M and is securely bolted to said beams. The strain upon the plows is further supported by the brace U, the lower end of which is attached to or formed solid upon the standard T and the mold-board Q, either or both. The upper parts of the braces V incline to the rearward, and their upper ends extend along and are securely bolted to the rear parts of the beams M. V is a guard to hold the plow-beams in proper position and sustain the lateral strain. The ends of the guard V are pivoted to lugs formed upon or attached to the under side of the axle B, so that the guard V, while always keeping its place at the side of the plow-beam, may swing back freely to pass any obstruction that it may strike against.

The rear ends of the side bars C are bent upward, and upon their upper ends are formed, or to them are attached, eyes, in which work the journals of the shaft W, to which are attached the pulleys or drums X, to which are attached the upper ends of the chains Y, the lower ends of which are secured to the cross-bar Z, which is secured to the beams M, so that by turning the shaft W the chains Y may be wound upon the pulleys X and the plows raised from the ground.

To the shaft W is attached the lower end of the lever A', the upper end of which extends into such a position that it may be conveniently reached and operated by the driver from his seat. To the lever A' is pivoted a loop or link, B', through which passes the keeper C', beneath which is placed a toothed bar, D'. The rear ends of the toothed bar D' and the keeper C' are attached to the axle B, and their forward ends are attached to the cross-bar I. By this construction, as the lever A is moved forward to raise the plows from the ground the loop B' slides over the teeth of the bar D', ready to catch upon one of said teeth when the lever A' is released to hold the plows suspended.

Having thus described my invention, I claim as new and desire to secure by Letters Patent—

1. In three-horse plows, the beams M M, combined with draft-bar and block O P having long upper double-tree clevis $o^1$ and short lower middle-horse single-tree clevis $o^2$, for the purpose of enabling the middle horse to walk in the furrow, one side horse on the land, and the other on the plowed ground.

2. The vibratory guard V pivoted to the axle and applied to the beams, as specified.

H. B. SMITH.

Witnesses:
L. R. RYANT,
JNO. F. SMITH.